United States Patent [19]
Jacobs

[11] 3,810,728
[45] May 14, 1974

[54] INJECTION MOLDING MACHINE
[76] Inventor: Arthur W. Jacobs, 5994 Columbia Rd., North Olmsted, Ohio 44070
[22] Filed: Sept. 15, 1972
[21] Appl. No.: 289,436

[52] U.S. Cl.................. 425/244, 425/147, 425/245
[51] Int. Cl............................................... B29f 1/04
[58] Field of Search ........... 425/145, 147, 244, 245, 425/242, 155; 415/72

[56] References Cited
UNITED STATES PATENTS

| | | | |
|---|---|---|---|
| 3,510,915 | 5/1968 | Johansson............................ | 425/147 |
| 3,609,817 | 9/1969 | Deerberg........................ | 425/242 X |
| 3,319,299 | 5/1967 | Kiraly.............................. | 425/245 X |
| 3,086,244 | 5/1963 | Hehl................................ | 425/248 X |
| 3,538,549 | 11/1970 | Hehl................................. | 425/145 |
| 3,729,280 | 5/1973 | Hehl............................... | 425/242 X |

Primary Examiner—J. Spencer Overholser
Assistant Examiner—David B. Smith
Attorney, Agent, or Firm—Donnelly, Maky, Renner & Otto

[57] ABSTRACT

A reciprocating screw type injection molding machine having an injection assembly in which the feed screw is rotated and reciprocated in a heating cylinder by means of coaxially disposed linear and rotary hydraulic actuators respectively comprising an actuating cylinder having its piston in axial thrust and rotary driving engagement with the feed screw, and a fixed rotary actuator housing having its rotor axially slidably splined to said piston. The injection assembly has limited axial travel with respect to the rotary actuator housing to move the spring-closed nozzle of the heating cylinder into and out of engagement with the mold, said nozzle being opened when engaged with the mold upon admission of fluid pressure into the actuator cylinder between one side of said housing and said piston, and being closed when disengaged from the mold upon admission of fluid pressure into the actuating cylinder on the other side of said housing to initiate rotation of said rotor and feed screw. The limited axial travel aforesaid is provided by interengageable positive stops on the actuator cylinder and rotary actuator housing to determine the extent of movement of the heating cylinder and nozzle away from and toward the mold respectively to permit closing of the spring biased nozzle and to prevent jamming of the nozzle against the mold except by the spring bias acting thereon and by the pressure drop across the nozzle as the plasticized material is flowing therethrough into the mold.

The machine herein is yet further characterized in that the injection assembly optionally may be mounted in a vertical position or in a horizontal position or if desired both horizontal and vertical injection assemblies may be provided for sequential injection of plasticized material of different colors or compositions into the mold.

9 Claims, 3 Drawing Figures

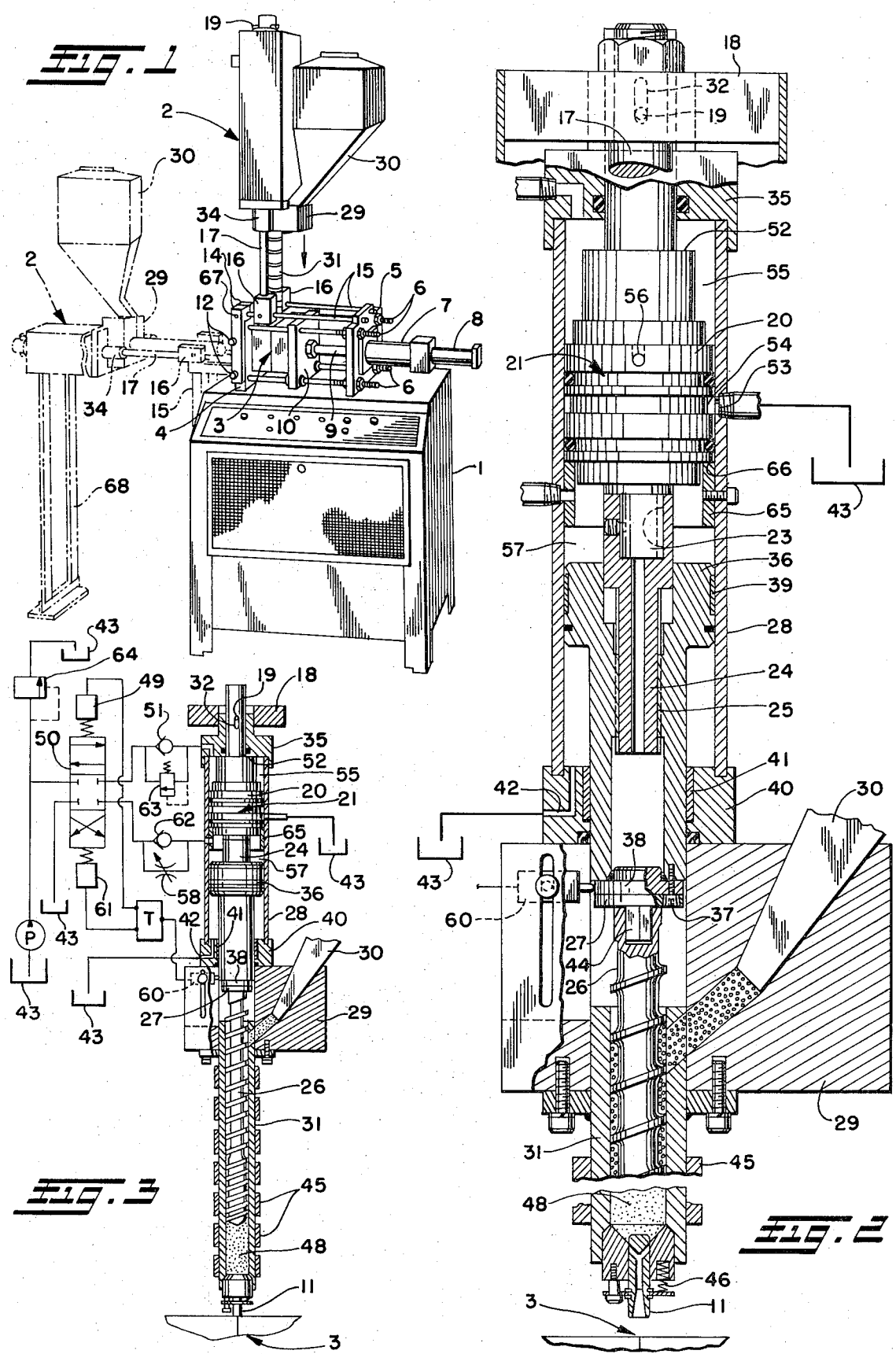

INJECTION MOLDING MACHINE

BACKGROUND OF THE INVENTION

Reciprocating screw type injection molding machines as known in the art, generally comprise a reciprocating feed screw which is moved axially in a heating cylinder by means of a piston connected to the rear end of the feed screw and which is rotated by an eccentrically disposed drive motor having a drive gear, a worm, or a drive sprocket and chain engaged respectively with a gear, a worm wheel, or a sprocket wheel in which the feed screw is axially slidably splined. As evident, the turning of the feed screw by drive means of the character indicated imposes severe lateral force on the feed screw with accompanying rapid wear of the bore of the heating cylinder unless widely spaced apart radial bearings are employed to withstand such lateral force.

In-line reciprocating screw type injection molding machines are known (see, for example, FIG. 5 on page 408 of 1971–1972 Modern Plastics Encyclopedia) wherein a hydraulic motor housing is secured to the rear end of the actuating cylinder and wherein the motor rotor is splined to the piston which rotates and reciprocates in the actuating cylinder, the piston being connected to the rear end of the feed screw. In such in-line machine the nozzle remains in engagement with the mold during the entire cycle of operation of the machine and hence it is generally necessary to provide a heater band around the nozzle to prevent freeze up of material in the nozzle passage by extraction of heat therefrom by the mold during the time that the screw is turning and axially retracted to deposit plasticized material into the collecting chamber between the nozzle and the tip of the feed screw.

SUMMARY OF THE INVENTION

In contradistinction to the above referred to known types of reciprocating screw injection molding machines the coaxially disposed linear and rotary hydraulic actuators herein avoid the imposition of lateral forces on the feed screw and piston of the linear actuator.

It is another object of this invention to provide an in-line reciprocating screw type injection molding machine in which the feed screw rotating motor has its housing mounted in fixed position with respect to the base of the machine and in which the actuator cylinder and the rotary actuator housing define a valve means which is opened by movement of the actuator cylinder when fluid under pressure is introduced into the cylinder to actuate the rotary actuator, such movement of the actuator cylinder and heating cylinder serving to withdraw the nozzle out of engagement with the mold thus to close the nozzle.

It is another object of this invention to provide an in-line reciprocating screw type injection molding machine in which the injection assembly is moved to a stop position to engage the nozzle with the mold by fluid pressure acting on the piston of the linear actuator and by the resulting pressure exerted on the plasticized material upstream of the nozzle by the feed screw, such movement of the injection assembly effecting opening of the nozzle for injection of the plasticized material into the mold by continued movement of the piston and feed screw.

It is yet another object of this invention to provide an in-line reciprocating screw type injection molding machine in which the injection assembly is readily mountable on the base of the machine in a vertical position or in a horizontal position to inject plastic material into the mold, or in which there are vertical and horizontal injection assemblies for sequential injection of plastic materials of different compositions or different colors into the mold.

Yet another object of this invention is to provide a machine of the character indicated having a self-aligning drive member between the piston and feed screw to eliminate cocking strains on the piston and feed screw in the event of eccentricity thereof.

DESCRIPTION OF THE DRAWING

FIG. 1 is a perspective view of a machine embodying the present invention;

FIG. 2 is a central vertical cross-section view of the injection assembly; and

FIG. 3 is a cross-section view similar to FIG. 2 except showing a preferred form of control circuit to obtain automatic cycling of the machine.

DETAILED DESCRIPTION OF THE INVENTION

The injection molding machine herein as shown in FIG. 1, comprises a base cabinet 1 within which is housed hydraulic control equipment for actuating the injection assembly 2 and for opening and closing the mold 3.

On the top of the base cabinet 1 are mounted fixed platens 4 and 5 joined together by tie rods 6, the platen 4 having secured thereto one part of the mold 3, and the platen 5 having secured thereto a mold clamp cylinder 7 and a clamp pressure intensifying cylinder 8, the piston rod 9 of the clamp cylinder 7 being secured to a movable platen 10 which carries the other part of the mold 3 and which is guided on the tie rods 6 for movement toward and away from the fixed platen 4 and the mold part secured thereto. When the aforesaid parts of said mold 3 are in mating engagement they define therebetween a mold cavity into which plasticized material is injected from the injection assembly 2 which in FIG. 1 is shown mounted in a vertical position with the spring biased nozzle 11 in register with a mold sprue at the parting line between the parts of mold 3.

The fixed platen 4 has secured on opposite sides thereof by the screws 12 a pair of L-shaped links 14 which have portions extending toward each other above the upper tie rods 6 and extending from said links 14 through holes in the other fixed platen 5 are injection assembly support bars 15 on which the blocks 16 are adjustably secured to effect alignment of the nozzle 11 with the sprue of mold 3. Extending upwardly from said blocks 16 are guide rods 17 which are connected together at their upper ends by a crosshead 18. Fixedly secured to the crosshead 18 as by means of the cross pin 19 is the shaft portion of a housing 20 of a feed screw drive motor 21, and the rotor shaft 23 of said motor 21 is secured to a male spline member 24 which is axially slidably keyed in a female spline 25 in piston 36, the latter being in axial thrust and rotary driving engagement with the upper end of the feed screw 26 through drive member 27 as will presently be described.

The entire actuator cylinder 28, feed box 29 and hopper 30, and heating cylinder 31 assembly is mounted for vertical movement as permitted by the slot 32 through which the pin 19 passes and said assembly is guided on the vertical bars 17 as by means of bearings 34 provided on the feed box 29. Guiding also occurs at the upper end whereat the shaft portion of the actuating cylinder head 35 is vertically movable on the shaft portion of the motor housing 20 and in the crosshead 18.

Reciprocable and rotatable in the lower end of the actuating cylinder 28 is the piston 36 which has clamped to its lower end by the screws 37 a closure plate 38. The piston 36 has molded therein a nylon or like bearing ring 39 and may be provided with a suitable packing ring as shown. Adjacent the lower end of the actuating cylinder 28 is a cylinder head 40 with a bronze bearing 41 therein, said head 40 having a drain passage 42 communicated with the reservoir 43 so that hydraulic oil which may leak past the piston 36 will be effective to lubricate the bearing 41.

The feed screw 26 has axial thrust and rotary driving engagement with the piston 36 through the drive member 27, the latter having a square portion 44 fitting in a square recess in the upper end of said feed screw 26 and tapered holes loosely fitting over the tapered heads of the screws 37.

The heating cylinder 31 is of familiar form having electric heating bands 45 therearound and the lower end thereof has a nozzle 11 which constitutes a shut off valve which is closed by the several springs 46 when the injection assembly 2 is in its elevated position as shown in FIG. 2 with the tip of the nozzle 11 out of engagement with the mold 3. By reason of such upward movement of the injection assembly 2, no heating band 45 is required around the nozzle 11 since it is not in heat conducting relation to the mold 3 and hence the plastic material will not freeze in the nozzle 11 even in the absence of such heater band 45 therearound.

When the feed screw 26 is at the lower end of its stroke in the heating cylinder 31 with plasticized material in the collecting chamber 48 having been injected through the open nozzle 11 into the mold 3, the closing of switch contacts in the timer T energizes the upper solenoid 49 of the four way valve 50 to conduct fluid under pressure from the pump P to the upper end of the actuating cylinder 28 via the check valve 51. At that time the injection assembly is in its down position with its upper cylinder head 35 engaged with the stop shoulder 52 on the motor housing 20 and in that position the outlet opening 53 in the actuating cylinder 28 is out of register with the motor outlet port 54 and hence pressure will build up in the chamber 55 to lift the entire injection assembly 2 to disengage the nozzle 11 from the mold 3 whereupon the springs 46 are effective to seat the nozzle 11. When the injection assembly is thus lifted, the outlet port 53 in the cylinder 28 registers with the outlet port 54 of the motor housing 20 whereupon oil will flow from the chamber 55 into the motor 21 through the inlet port 56 to effect turning of the rotor shaft 23 and feed screw 26. As the feed screw 26 rotates the pellets or chips of plastic material are deposited around the hub of the screw 26 and are advanced downwardly and worked and melted and deposited in the collecting chamber 48 at the lower end of the heating cylinder 31. Back pressure on the plasticized material in collecting chamber 48 is exerted by throttling the exhaust from the cylinder chamber 57 through an adjustable restrictor 58 through which the displaced oil passes to the reservoir 43 via the four way valve 50. Accordingly, as the screw 26 rotates it moves upwardly under the resistance of the adjustable restrictor 58 thus to apply desired pressure on the plasticized material as it collects in the collecting chamber 48.

When there is sufficient plasticized material in the collecting chamber 48 to fill the mold 3 the switch 60 is closed to energize timer T to close contacts therein to energize the lower solenoid 61 to communicate the pump P delivery line with the injection chamber 57 via valve 50 and the check valve 62, and to communicate the motor chamber 55 with the reservoir 43 via the counterbalance valve 63 and valve 50, the counterbalance valve 63 being normally closed thus to prevent downward drifting of the injection assembly 2. As now apparent, fluid under pressure in the injection chamber 57 will tend to move the piston 36 and feed screw 26 downwardly and since the nozzle 11 is in closed position, the plasticized material in the collecting chamber 48 will urge the injection assembly 2 downwardly until the upper head 35 engages the stop shoulder 52 and prior to that time the nozzle 11 contacts the mold 3 whereby the nozzle 11 is opened and retained against the mold 3 by the pressure of the springs 46. Such downward movement of the injection assembly 2 will build up pressure in the motor chamber 55 sufficient to open the counterbalacnce valve 63 for flow of oil from the chamber 55 to the reservoir 43 via the counterbalance valve 63 and four way valve 50. As aforesaid, when the injection assembly 2 is in its lowered position with the nozzle 11 open and engaged with the mold 3 the outlet ports 53 and 54 are out of registry.

The piston 36 then continues its downward movement to inject the plasticized material in the collecting chamber 48 through the open nozzle 11 into the mold 3. After the plasticized material has been injected into the mold 3 under a pressure as determined by the adjustable relief valve 64 and after it solidifies therein as determined by the setting of timer T, the clamp cylinder 7 may be actuated by valve means (not shown) to move the movable platen 10 and mold section carried thereby away from the fixed mold section on platen 4 and as well known in the art suitable stripping mechanism may be provided to strip the molded article from the open mold 3. When the timer T cycle runs out, it opens the contacts for solenoid 61 and closes the contacts for the upper solenoid 49 to repeat the automatic operation of the machine with oil being admitted into the motor chamber 55 through the four way valve 50 and check valve 51, again to raise the injection assembly 2 until the outlet ports 53 and 54 are in register and the stop ring 65 engages the stop shoulder 66 and at that time the rotation of the feed screw 26 commences with upward movement of the feed screw 26 and piston 36 under a predetermined back pressure as determined by the adjustable restrictor 58.

In the injection molding machine herein, the injection assembly 2 including the actuating cylinder 28, the feed box 29 and hopper 30, and the heating cylinder 31 may be optionally mounted in a horizontal position as shown in phantom lines in FIG. 1. In order to convert the machine from a vertical machine to a horizontal machine, the upper screws 12 which secure the links 14 to the fixed platen 4 may be removed and the links 14 and bars 15 swung to a vertical position. The bars 15 are adjusted downwardly with the blocks 16 being mounted on the upper ends of said bars 15. The injection assembly 2, when mounted in a horizontal position has its nozzle 11 aligned with a central sprue in the mold part which is secured to the platen 4 by adjusting the blocks 16 upwardly or downwardly with respect to the bars 15, the bars 15 being adjustably secured as by screws 67 to the respective links 14. For such horizontal mounting, the feed box 29 is provided with a feed opening for mounting the feed hopper 30 as shown in phantom lines in FIG. 1. To minimize bending strain on the guide rods 17 as caused by the weight of the injection assembly 2, a stand 68 is desirably provided.

In case it is desired to provide both a horizontal and a vertical injection assembly 2 as for two-color sequential injection, the horizontal cylinder assembly may be mounted as shown in phantom lines in FIG. 1, but in that case since the bars 15 are not present, the blocks 16 for the vertical assembly 2 may be modified to be secured on the upper tie rods 6, again the blocks 16 being adjustable along the upper tie rods 6 to align the injection nozzle 11 with the mold 3.

In summary, it can be seen that the present invention provides a simple and efficient form of reciprocating screw type injection molding machine in which a feed screw drive motor 21 and injection piston 36 are coaxially aligned with the feed screw 26 and in which the motor housing 20 divides the actuator cylinder 28 into a motor chamber 55 for operating the rotary motor 21 and into an injection chamber 57 which axially moves the piston 36 and feed screw 26 so that the latter operates as a plunger to inject the plasticized material in the collecting chamber 48 of the heating cylinder 31 into the mold 3. Moreover, by reason of the novel nozzle construction and retractable injection assembly, no heating band 45 is required around the nozzle 11 since it is not in heat conducting relation to the mold 3 at the time of filling of the collecting chamber 48 whereby there is no freeze up of material in the nozzle 11 even in the absence of such nozzle heating band.

The embodiment of the invention in which an exclusive property or privilege is claimed are defined as follows:

1. In a reciprocating screw type injection molding machine having a mold and an injection assembly including a heating cylinder having an injection nozzle engageable with said mold, a feed screw rotatable and axially reciprocable in said heating cylinder, and drive means operative to rotate said feed screw in said heating cylinder to deposit material fed thereto and plasticized thereby into a collecting chamber in said heating cylinder as said feed screw is retracted by progressive enlargement of said collecting chamber, and to axially advance said feed screw in said heating cylinder to inject the plasticized material from said collecting chamber through said nozzle into said mold, the improvement which comprises drive means including co-axial linear and rotary fluid motors of which the former comprises an actuating cylinder coaxially secured to said heating cylinder, and a piston reciprocable therein and having axial thrust and rotary drive engagement with said feed screw; and of which the latter comprises a fixed housing sealed in said cylinder between the ends thereof and adjacent to said piston, and a rotor in said housing which is axially slidably keyed to said piston to permit axial retraction of said feed screw and piston while rotated by said rotor; said actuating cylinder having an inlet port for fluid under pressure between one side of said housing and said piston to effect advance of said feed screw in said heating cylinder; said actuating cylinder being mounted for limited axial reciprocation with respect to said housing and said mold to move said nozzle into and out of engagement with said mold; and valve means associated with said rotary fluid motor opened upon movement of said actuating cylinder to a position retracting said nozzle from said mold thus to initiate rotation of said rotor and feed screw.

2. The machine of claim 1 wherein said actuating cylinder has another inlet port on the other side of said housing for entry of fluid pressure to move said actuating cylinder to retract said nozzle from said mold and to rotate said rotor and said piston thus to rotate said feed screw in said heating cylinder.

3. The machine of claim 1 wherein said valve means comprises outlet ports in said housing and said actuating cylinder which are out of registry with each other when said nozzle is engaged with said mold and which are in register with each other when said nozzle is disengaged from said mold.

4. The machine of claim 3 wherein said actuating cylinder is moved to retract said nozzle from said mold upon admission of fluid under pressure into said cylinder on the other side of said housing while said valve means is in closed position.

5. The machine of claim 1 wherein a feed box and hopper is mounted between said heating cylinder and said actuator cylinder, said heating cylinder having a feed opening registering with an opening in said feed box through which plastic material in solid form is adapted to be fed into said heating cylinder around the hub of said feed screw for advancing and compressing of the material to plasticize it during rotation of said feed screw and consequent advance of material to said collecting chamber.

6. In a reciprocating screw type injection molding machine having a mold and an injection assembly including a heating cylinder having an injection nozzle engageable with said mold, a feed screw rotatable and axially reciprocable in said heating cylinder, and drive means operative to rotate said feed screw in said heating cylinder to deposit material fed thereto and plasticized thereby into a collecting chamber in said heating cylinder as said feed screw is retracted by progressive enlargement of said collecting chamber, and to axially advance said feed screw in said heating cylinder to inject the plasticized material from said collecting chamber through said nozzle into said mold, the improvement which comprises drive means including coaxial linear and rotary fluid motors of which the former comprises an actuating cylinder coaxially secured to said heating cylinder, and a piston reciprocable therein and having axial thrust and rotary drive engagement with said feed screw; and of which the latter comprises a fixed housing sealed in said cylinder between the ends thereof and adjacent to said piston, and a rotor in said housing which is axially slidably keyed to said piston to permit axial retraction of said feed screw and piston while rotated by said rotor; said actuating cylinder being mounted for limited axial reciprocation with respect to said housing to move said nozzle into and out of engagement with said mold; said actuating cylinder having a first port for fluid under pressure between one side of said housing and said piston to effect advance of said feed screw in said heating cylinder and to effect movement of said actuating cylinder to engage said nozzle with said mold, and having a second port for fluid under pressure between the other side of said housing which has a pressure inlet port and the adjacent end of said actuating cylinder to effect movement of said actuating cylinder to disengage said nozzle from said mold and to effect rotation of said rotor and feed screw.

7. The machine of claim 6 wherein valve means between a fluid pressure source and said actuating cylinder is operative to selectively conduct fluid under pressure to either one of said ports while the other port is communicated with a fluid reservoir via said valve means.

8. The machine of claim 7 wherein fluid restrictor means between said first port and said valve means builds up back pressure on the material in said collecting chamber during rotation and retraction of said feed screw.

9. The machine of claim 7 wherein said actuating cylinder and said housing have outlet ports which are respectively in and out of registry with each other when said nozzle is disengaged from and engaged with said mold.

* * * * *